US008780746B2

(12) United States Patent
Inagaki

(10) Patent No.: US 8,780,746 B2
(45) Date of Patent: Jul. 15, 2014

(54) COMMUNICATION APPARATUS, COMMUNICATION METHOD, AND A COMPUTER-READABLE MEDIUM

(75) Inventor: Tomohiro Inagaki, Aichi-ken (JP)

(73) Assignee: Brother Kogyo Kabushiki Kaisha, Aichi-ken (JP)

(*) Notice: Subject to any disclaimer, the term of this patent is extended or adjusted under 35 U.S.C. 154(b) by 388 days.

(21) Appl. No.: 13/172,459

(22) Filed: Jun. 29, 2011

(65) Prior Publication Data

US 2012/0002566 A1    Jan. 5, 2012

(30) Foreign Application Priority Data

Jun. 30, 2010 (JP) ................... 2010-150584

(51) Int. Cl.
*H04L 12/26* (2006.01)

(52) U.S. Cl.
CPC ................. *H04L 43/0882* (2013.01)
USPC ......................... 370/252; 370/232

(58) Field of Classification Search
CPC ....... H04L 43/02; H04L 43/024; H04L 43/08; H04L 43/0817; H04L 43/0823; H04L 43/0876; H04L 43/0882; H04L 43/12
USPC ........................ 370/229, 230, 232, 241, 252
See application file for complete search history.

(56) References Cited

U.S. PATENT DOCUMENTS

2002/0095474 A1* 7/2002 Boys ........................... 709/217
2004/0071086 A1* 4/2004 Haumont et al. ............ 370/230

FOREIGN PATENT DOCUMENTS

| JP | 2004-215026 A | 7/2004 |
|---|---|---|
| JP | 2007-067925 | 3/2007 |
| JP | 2007-67926 A | 3/2007 |
| JP | 2008-141611 A | 6/2008 |

OTHER PUBLICATIONS

Machine Translation of JP 2008-141611.*
Machine Translation of JP 2004-215026.*
C. Le Thanh Man et al.; "A study on Inline Network Measurement Mechanism for Service Overlay Networks"; The Institute of Electronics, Information and Communication Engineers, pp. 53-58, vol. 102, No. 565; Jan. 17, 2003.
T. Tsugawa et al.; "Implementation and evaluation of an inline network measurement algorithm and its application technique"; Technical Report of the Institute of Electronics, Information and Communication Engineers (IN2005-120), pp. 79-84; Dec. 2005.
C. Le Thanh Man et al.; Inline Bandwidth Measurement Techniques for Gigabit Networks, International Journal of Internet Protocol Technology (IJIPT); vol. 3, No. 2, pp. 81-94, 2008.
Japanese Office Action "Notice of Reasons for Rejection" dated Jul. 17, 2012; Japanese Patent Application No. 2010-150584; with translation.

(Continued)

*Primary Examiner* — Paul H Masur
(74) *Attorney, Agent, or Firm* — Studebaker & Brackett PC

(57) ABSTRACT

The disclosure provides a communication apparatus that can accurately measure the available bandwidth of a communication path between itself and another communication apparatus by performing measurement communication in accordance with an execution frequency. The communication apparatuses can select the optimum communication method in accordance with the identified available bandwidth, so that each of the communication apparatuses can reliably perform communication with a counterpart apparatus. The execution frequency is identified in accordance with the communication stability so that an appropriate execution frequency can be identified for each bidirectional communication path. In this way, communication apparatuses can accurately measure the available bandwidth by performing measurement communication with the optimum execution frequency.

22 Claims, 10 Drawing Sheets

(56) References Cited

OTHER PUBLICATIONS

Kenichiro Fujiyama et al.; A Dynamic Polling Method with Small Memory for Large-scale Server Performance Monitoring; IPSJ Technical Report; Jul. 28, 2009; vol. 2009-DBS-146 No. 18; Service Platform Research Laboratories, NEC Corporation, Japan; with abstract.

* cited by examiner

Fig.2

| COMMUNICATION RELIABILITY | COMMUNICATION STABILITY | | |
|---|---|---|---|
| | (1) EQUAL TO OR LARGER THAN 10% | (2) SMALLER THAN 10% | (3) 2 MBPS OR MORE |
| (i) HIGH | 3/3 | 3/3 | 3/3 |
| (ii) INTERMEDIATE | 3/3 | 3/3 | 3/3 |
| (iii) LOW | 2/3 | 1/3 | 1/3 |

| BIDIRECTIONAL COMMUNICATION PATH | FIRST APPARATUS ID | SECOND APPARATUS ID | AVAILABLE BANDWIDTH | ACTUALLY USED BANDWIDTH | | |
|---|---|---|---|---|---|---|
| 11—12 | 11 | 12 | ... | ... | ... | ... |
| | 12 | 11 | ... | ... | ... | ... | 31
| 11—13 | 11 | 13 | ... | ... | ... | ... |
| | 13 | 11 | ... | ... | ... | ... | 34
| 11—14 | 11 | 14 | ... | ... | ... | ... |
| | 14 | 11 | ... | ... | ... | ... | 36
| 12—13 | 12 | 13 | ... | ... | ... | ... | 32
| | 13 | 12 | ... | ... | ... | ... |
| 12—14 | 12 | 14 | ... | ... | ... | ... | 33
| | 14 | 12 | ... | ... | ... | ... |
| 13—14 | 13 | 14 | ... | ... | ... | ... | 35
| | 14 | 13 | ... | ... | ... | ... |

| COMMUNICATION APPARATUS ID | 11 | 12 | 13 | 14 |
|---|---|---|---|---|
| ATTRIBUTE | (c) OTHER | (c) OTHER | (b) CHAIRPERSON | (a) DOCUMENTS |

243

COMMUNICATION APPARATUS, COMMUNICATION METHOD, AND A COMPUTER-READABLE MEDIUM

CROSS-REFERENCE TO RELATED APPLICATION

This application claims priority to Japanese Patent Application No. 2010-150584, filed Jun. 30, 2010, the disclosure of which is hereby incorporated herein by reference in its entirety.

BACKGROUND

The present disclosure relates to a communication apparatus, a communication system, a communication method, and a computer-readable medium storing a communication program, which can accurately measure an available bandwidth of a communication path between communication apparatuses.

Communication apparatuses have been known that can measure an available capacity of a transmission path in a communication network (such as the Internet) whose communication environment changes. Hereinafter, the "capacity of a transmission path" may be referred to as the "bandwidth", and an available capacity of the transmission path will be referred to as an "available bandwidth". For example, such communication apparatuses are configured so that a communication apparatus transmits a measurement packet to a counterpart communication apparatus. A communication apparatus that has transmitted a measurement packet will be referred to as a "transmitting apparatus." A counterpart apparatus for the transmitting apparatus will be referred to as a "receiving apparatus." The receiving apparatus can measure the available bandwidth of a communication path between the receiving apparatus and the transmitting apparatus by receiving a measurement packet. The receiving apparatus thereafter notifies the transmitting apparatus of the available bandwidth. The transmitting apparatus and the receiving apparatus can increase the reliability of communication by selecting an appropriate communication method in accordance with the measured available bandwidth.

For a communication path having low communication stability, it is desirable that the available bandwidth be frequently measured. By frequently measuring the available bandwidth, the available bandwidth can be promptly and accurately acquired even if the communication environment changes, and thereby the communication apparatus can select the optimum communication method and perform reliable communication.

SUMMARY

The present disclosure provides a communication apparatus, a communication system, a communication method, and a non-transitory computer-readable medium storing a communication program, which can accurately measure an available bandwidth of a communication path and reliably perform communication between communication apparatuses.

According to a first aspect of the present disclosure, a communication apparatus includes a determination device configured to determine a communication stability in accordance with an available bandwidth of a communication path between the communication apparatus and a counterpart communication apparatus, the communication stability representing whether or not communication is stably performed via the communication path, and an identification device configured to identify, in accordance with the determined communication stability, an execution frequency of bandwidth measurement communication for the communication path.

According to a second aspect of the present disclosure, a communication system includes a communication apparatus and plural counterpart communication apparatuses, where each counterpart apparatus has a communication path to the communication apparatus. The communication system includes an acquisition device configured to acquire an available bandwidth of each of at least two of the communication paths, a determination device configured to determine, for each of the at least two communication paths, a communication stability in accordance with the acquired available bandwidth, where each determined communication stability representing whether or not communication is stably performed along the respective communication path. The communication system includes an identification device configured to identify, in accordance with each determined communication stability, an execution frequency of bandwidth measurement communication for each communication path, and a communication control device configured to control the communication apparatuses to perform the bandwidth measurement communications in accordance with each respective identified execution frequency.

According to a third aspect of the present disclosure, a communication method, which is performed by a communication terminal, includes determining a communication stability in accordance with an available bandwidth of a communication path between the communication terminal and a counterpart communication apparatus, the communication stability representing whether or not communication is stably performed along the communication path, and identifying, in accordance with the determined communication stability, an execution frequency of bandwidth measurement communication for the communication path.

According to a fourth aspect of the present disclosure, a non-transitory computer-readable medium storing a communication program that causes a communication terminal to perform instructions, the program comprising instructions that cause a computer to perform the steps of determining a communication stability in accordance with an available bandwidth of a communication path between the communication terminal and a counterpart communication apparatus, the communication stability representing whether or not communication is stably performed along the communication path, and identifying, in accordance with the determined communication stability, an execution frequency of bandwidth measurement communication for the communication path.

BRIEF DESCRIPTION OF THE DRAWINGS

FIG. 2 is a diagram showing an exemplary first table.

FIG. 3 is a diagram showing an exemplary second table.

FIG. 4 is a diagram showing an exemplary third table.

DETAILED DESCRIPTION OF THE EXEMPLARY EMBODIMENTS

Hereinafter, exemplary embodiments of the present disclosure will be described with reference to the drawings. These drawings are used for describing technical features that are applicable to the present disclosure. The configurations of apparatuses and the flowcharts of processes described here are examples, and the present disclosure is not limited thereto.

Prior communication apparatuses cannot change the frequency of measuring an available bandwidth in accordance with the stability of a communication path. Therefore, it takes time to measure the available bandwidth if the available bandwidth has changed, so that it may happen that the available bandwidth is not accurately measured. The inventors have recognized that there is a problem in that communication cannot be reliably performed between communication apparatuses.

Figure 1:
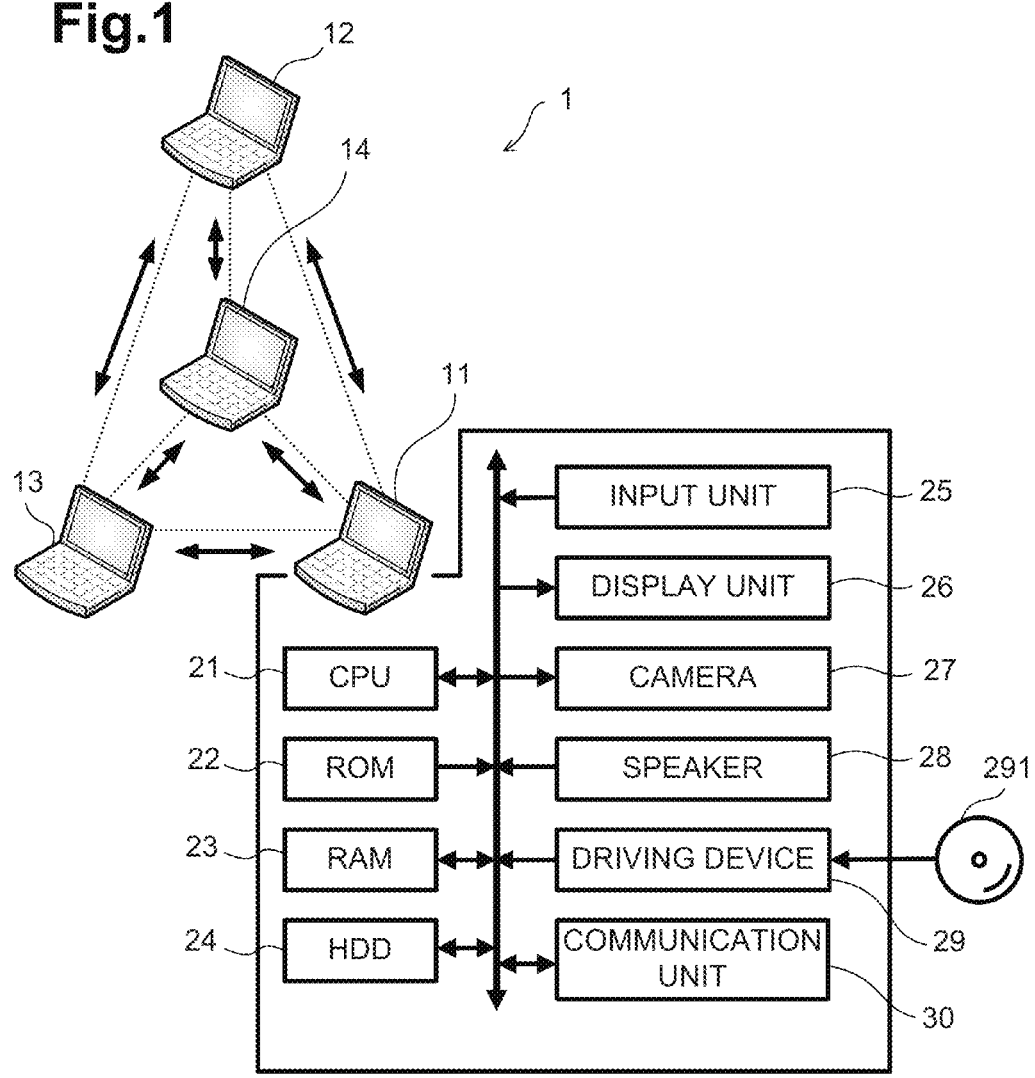
FIG. 1 is a diagram showing a communication system and an electrical configuration of a communication apparatus in accordance with an exemplary embodiment.

Referring to FIG. 1, an exemplary communication system 1 will now be described. The communication system 1 includes communication apparatuses 11 to 14. The communication apparatuses 11 to 14 can perform communication with each other via a network. For example, known PCs can be used as the communication apparatuses 11 to 14. A video conference can be held by using communication among the communication apparatuses 11 to 14, although application of communication among the communication apparatuses 11 to 14 is not limited to a video conference.

An exemplary electrical configuration of the communication apparatus 11 will now be described. The communication apparatuses 12 and 14 each can have the same or similar electrical configuration as that of the communication apparatus 11. The communication apparatus 11 includes a CPU 21 that controls the communication apparatus 11. The CPU 21 can be electrically connected to a ROM 22, a RAM 23, a hard disk drive (HDD) 24, an input unit 25, a display unit 26, a camera 27, a speaker 28, a driving device 29, and a communication unit 30. The ROM 22 stores a boot program, a BIOS, an OS, and the like. The RAM 23 stores a timer, a counter, and temporary data. The RAM 23 also stores a fourth table 244 described below (see FIG. 8). The HDD 24 stores a program for controlling the CPU 21. The HDD 24 also stores a first table 241 (see FIG. 2), a second table 242 (see FIG. 3), and a third table 243 (see FIG. 4). The input unit 25 includes a keyboard, a mouse, and a microphone for receiving input from a user. The display unit 26 displays a desired image. The driving device 29 can read information that is stored in a storage medium 291. For example, when setting up the communication apparatus 11, a control program that is stored in the storage medium 291 is read by the driving device 29 and stored in the HDD 24. The communication unit 30 controls timing when the communication apparatus communicates with another communication apparatus via a network.

Each of the communication apparatuses 11 to 14 can measure an available transmission capacity of a communication path between the communication apparatus and another communication apparatus by performing predetermined communication with the other communication apparatus. Hereinafter, a transmission capacity may be referred to as a "bandwidth," and an available transmission capacity may be referred to as an "available bandwidth." The communication apparatuses 11 to 14 identify the optimum communication method (the packet size, the transmission speed, an error detection and error correction method, retransmission control, and the like) for the communication environment in accordance with the measured available bandwidth. The communication apparatuses 11 to 14 can reliably perform communication with another communication apparatus on the basis of the identified communication method.

An available bandwidth of a communication path is measured on the basis of a method described in Cao Le Thanh Man, Go Hasegawa, Masayuki Murata, "A study on Inline Network Measurement Mechanism for Service Overlay Networks," Technical report of IEICE (The Institute of Electronics, Information and Communication Engineers), Jan. 17, 2003, Vol. 102, No. 565, pp. 53-58. With this method, a communication apparatus that transmits a measurement packet stores time information, which is used for calculating a transmission interval at which measurement packets are transmitted, in the measurement packet. The transmitting apparatus continuously transmits a plurality of measurement packets while changing a transmission bandwidth by gradually changing the transmission interval. A communication apparatus that receives a measurement packet stores a receiving interval at which packets are received. Subsequently, the difference between the transmission interval that is stored in the time information of the packets and the receiving interval stored in the receiving apparatus is calculated. An available bandwidth can be identified from the trend of change in the calculated differences. The transmitting apparatus is notified of the identified available bandwidth. Thus, the transmitting apparatus can acquire the available bandwidth. Hereinafter, a series of communications that are performed in order to measure the available bandwidth will be referred to as "measurement communication." A method of measuring an available bandwidth used in the present disclosure is not limited to the above-described method.

The communication environment of communication paths among the communication apparatuses 11 to 14 change due to changes in the traffic. Therefore, the available bandwidth of the communication path changes over time. In order to perform communication among the communication apparatuses 11 to 14 with a high reliability, it is desirable that measurement communication be frequently performed so as monitor the communication environment as accurately as possible. On the other hand, because measurement packets are transmitted and received among the communication apparatuses during measurement communication, a part of the bandwidth of the communication path is used, which can reduce the bandwidth that can be used by communication for video conference.

In the present exemplary embodiment, the communication stability, which represents whether or not the communication apparatuses 11 to 14 can smoothly perform communication, is determined for each combination of a transmitting path and a receiving path between two communication apparatuses. Hereinafter, a transmitting path and a receiving path between two communication apparatuses will be referred to as a "bidirectional communication path." For example, in the communication system 1 illustrated in FIG. 1, the communication stability is determined for each of bidirectional communication paths between the communication apparatus 11 and the communication apparatus 12 (hereinafter referred to as "the communication apparatuses 11 and 12"), between the communication apparatuses 11 and 13, between the communication apparatuses 11 and 14, between the communication apparatuses 12 and 13, between the communication apparatuses 12 and 14, and between the communication apparatuses 13 and 14. In accordance with the determined communication stability, the frequency, with which measurement communication via the bidirectional communication path is performed, is determined. Hereinafter, the frequency with which measurement communication is repeatedly performed will be referred to as the "execution frequency." If it is determined that communication can be stably performed between the communication apparatuses 11 and 14 (communication stability is high), the execution frequency is set lower than that if communication cannot be stably performed between the communication apparatuses 11 and 14 (communication stability is low). Thus, the measurement communication is performed the optimum number of times, so that the communication apparatuses 11 to 14 can accurately measure the available bandwidth of a communication path, and negative influence of measurement communication on communication for video conference is prevented. Moreover, in the present embodiment, the execution frequency is determined in accordance with communication reliability that is required for the communication path. The higher the communication reliability required for the communication path, the higher the execution frequency. Thus, when a high communication reliability is required for the communication path, the available bandwidth can be measured accurately. In the present embodiment, the communication stability is determined for each bidirectional communication path. However, the present disclosure is not limited thereto. For example, the communication stability may be determined for each communication path.

In the present exemplary embodiment, a specific one (communication apparatus 12) of the communication apparatuses 11 to 14 determines the execution frequency for all communication apparatuses (communication apparatuses 11 to 14). The communication apparatus 12 controls measurement communication among the communication apparatuses 11 to 14 in accordance with the determined execution frequency. However, the present disclosure is not limited thereto. For example, each communication apparatus can independently determine the execution frequency and can perform measurement communication in accordance with the determined execution frequency.

A method used by the communication apparatus 12 for determining the execution frequency will now be described. The communication apparatus 12 determines the execution frequency of measurement communication among the communication apparatuses 11 to 14 by looking up the first to third tables (i.e., tables 241, 242 and 243). Referring to FIG. 2, the first table 241, which is an example of a first table, will be described. The first table 241 stores the execution frequency "Y/X," which is associated with the communication stability (column direction) of the bidirectional communication path and the communication reliability (row direction) required for the bidirectional communication path. In the execution frequency "Y/X," "X" represents the number of executable timings of measurement communication that repeatedly arrive with predetermined time intervals (T (s)), and "Y" represents the actual number of timings at which measurement communications are performed. For example "2/3" represents that there are three executable timings and measurement communications are performed twice on the bidirectional communication path.

A method of determining the communication stability (column direction) of a bidirectional communication path will now be described. The communication stability of the bidirectional communication path is determined in accordance with which of the following conditions is satisfied:

(1) The historical deviation of measured available bandwidth is equal to or larger than 10%.

(2) The historical deviation of measured available bandwidth is smaller than 10%.

(3) The available bandwidth is larger than the bandwidth that is used when communication for video conference is performed (hereinafter referred to as "actually used bandwidth") by 2 Mbps or more.

As described above, the available bandwidth can be measured by transmitting a measurement packet from a transmitting apparatus to a receiving apparatus. The historical deviation of the measured available bandwidth is calculated. The deviation for each bidirectional communication path is calculated, and the calculated deviations are compared with each other. For example, regarding the bidirectional communication path between the communication apparatuses 11 and 12, the deviation of the available bandwidth of the communication path from the communication apparatus 11 to the communication apparatus 12 and the deviation of the available bandwidth of the communication path from the communication apparatus 12 to the communication apparatus 11 are compared with each other. Then, the larger deviation is identified as the deviation for the bidirectional communication path. In accordance with the identified deviation, which of above-described conditions (1) and (2) is satisfied is determined. Moreover, in accordance the available bandwidth and the actually used bandwidth, whether or not at least one of the communication paths constituting the bidirectional communication path satisfies the above-described condition (3) is determined. If the condition (3) is satisfied, the communication stability of the bidirectional communication path is identified as (3).

If the bidirectional communication path satisfies the condition (1) (the deviation is equal to or larger than 10%), the communication apparatus 12 determines that the communication stability of the bidirectional communication path is low. If the bidirectional communication path satisfies the condition (2) (the deviation is smaller than 10%), the communication apparatus 12 determines that the communication stability of the bidirectional communication path is high. If the bidirectional communication path satisfies the condition (3) (the available bandwidth is considerably larger than the actually used bandwidth), the bidirectional communication path can tolerate a change in the actually used bandwidth, so that it is determined that the communication stability is high. On the contrary, if the available bandwidth is close to the actually used bandwidth or the available bandwidth is smaller than the actually used bandwidth, the bidirectional communication path cannot tolerate a change in the actually used bandwidth, so that it is determined that the communication stability is low. When the communication stability is high, the execution frequency is reduced, so that unnecessary measurement communication may not be performed. In contrast, if the communication stability is low, the execution frequency is increased, so that the available bandwidth can be accurately measured.

A method of determining the communication stability of the bidirectional communication path is not limited to the above-described method. For example, the communication stability of the bidirectional communication path can be determined in accordance with whether another parameter, such as the historical variance or the average of measured available bandwidth, satisfies a predetermined condition. For example, the communication stability of the bidirectional communication path can be determined in accordance with the ratio of the available bandwidth to the actually used bandwidth.

A method of determining the communication reliability (row direction) required for the bidirectional communication path will now be described. The communication reliability required for the bidirectional communication path can be determined in accordance with the attributes of the communication apparatuses 11 to 14. The attributes can represent the functions the communication apparatuses 11 to 14 perform in the video conference. For example, the communication apparatuses 11 to 14 can each have one of the following attributes (a) to (c):

(a) The communication apparatus can include the HDD 24 that stores documents used in the video conference.

(b) The communication apparatus can be used by a chairperson of the video conference.

(c) Other.

If one of the communication apparatuses connected to the bidirectional communication path has the attribute (a), it is determined that the communication reliability required for the bidirectional communication path is high (i.e., "(i) HIGH" in FIG. 2). This is because the members of the video conference need to acquire the documents by performing communication with the communication apparatus having the attribute (a). If one of the communication apparatuses connected to the bidirectional communication path has the attribute (b), it is determined that the communication reliability required for the bidirectional communication path is intermediate (i.e., "(ii) INTERMEDIATE" in FIG. 2). This is because the members of the video conference need to recognize the proceedings of the video conference by accurately receiving the image and voice of the chairperson. If the communication apparatuses connected one end of the bidirectional communication path has the attribute (a) and the communication apparatuses connected the other end of the bidirectional communication path has the attribute (b), it is determined that the communication reliability required for the bidirectional communication path is high. If both communication apparatuses connected to the bidirectional communication path do not have any of attributes (a) and (b), it is determined that the communication reliability required for the bidirectional communication path is low ("(iii) LOW" in FIG. 2).

If the communication reliability required for the bidirectional communication path is high, the communication apparatus 12 increases the execution frequency so that the available bandwidth can be accurately measured. On the contrary, if communication reliability required for the bidirectional communication path is low, the communication apparatus 12 reduces the execution frequency so that unnecessary measurement communication may not be performed.

A method of determining the communication reliability required for the bidirectional communication path is not limited to the method described above. For example, the communication reliability required for each bidirectional communication path may be directly input by a user.

Referring to FIG. 3, the second table 242, which is an example of a second table, will now be described. The second table 242 stores historical data of the available bandwidths of all bidirectional communication paths (each including two communication paths) among the communication apparatuses 11 to 14. The second table 242 also stores the actually used bandwidth that was actually used when communication for video conference was performed on each communication path. The communication apparatus 12 stores the measured available bandwidth in the second table 242. Moreover, the communication apparatus 12 stores in the second table 242 the actually used bandwidth that is acquired by monitoring the communication state when performing communication for video conference.

As illustrated in FIG. 3, the available bandwidth and the actually used bandwidth of each communication path are associated with communication apparatuses that are connected to both ends of the bidirectional communication path. For example, in the second table 242, the available bandwidth that is measured by transmitting a measurement packet from the communication apparatus 11 to the communication apparatus 12 and the actually used bandwidth when packets for video conference are transmitted from the communication apparatus 11 to the communication apparatus 12 are associated with "FIRST APPARATUS ID 11, SECOND APPARATUS ID 12."

Referring to FIG. 4, the third table 243, which is an example of a third table, will now be described. The third table 243 stores the attributes of the communication apparatuses 11 to 14, which are associated with the IDs of the communication apparatuses. The communication apparatus 12 acquires the attributes of the communication apparatuses 11 to 14 and stores the attributes in the third table 243.

The communication apparatus 12 identifies the communication stability ((1) to (3), see FIG. 2) of each bidirectional communication path in accordance with the history of the available bandwidth stored in the second table 242 (see FIG. 3) and the actually used bandwidth. Moreover, the communication apparatus 12 identifies the communication stability required for each bidirectional communication path in accordance with the attributes ((i) to (iii), see FIG. 2) stored in the third table 243 (see FIG. 4). The communication apparatus 12 indentifies the execution frequency for each bidirectional communication path by applying the identified communication stability and the communication reliability to the first table 241 (see FIG. 2). In this way, the communication apparatus 12 can uniquely determine the execution frequency in accordance with the communication stability and the communication reliability required for the communication path. The communication apparatus 12 can easily indentify the execution frequency by looking up the first table 241.

Figure 5:
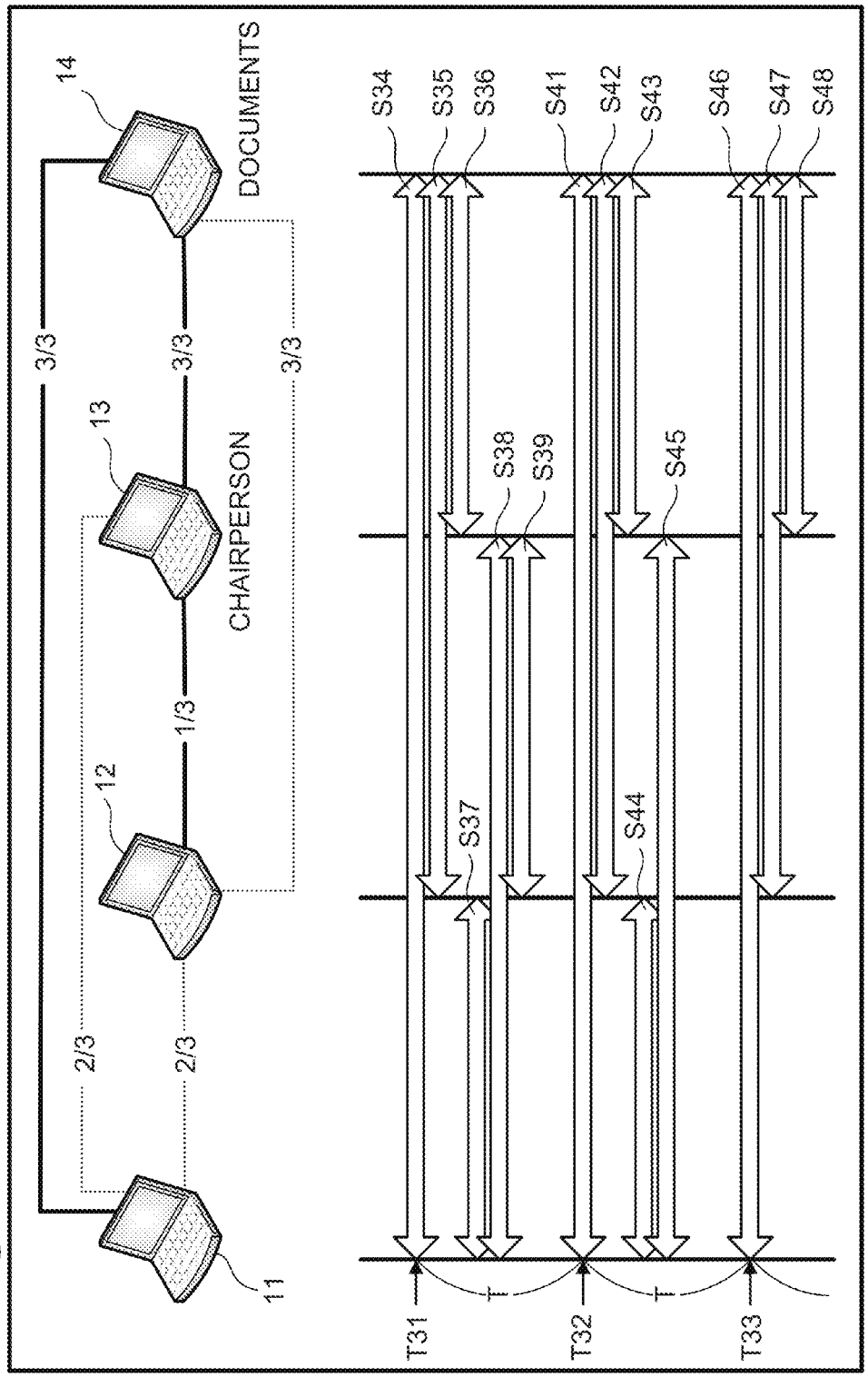
FIG. 5 is a schematic diagram showing an exemplary communication sequence.

Referring to FIG. 5, an exemplary communication sequence that is followed when measurement communication is performed with the determined execution frequency will now be described. It is assumed that a user of the communication apparatus 13 is the chairperson of a video conference. It is assumed that the HDD 24 of the communication apparatus 14 stores all documents that are used during the video conference. It is assumed that the communication stability of the bidirectional communication path between the communication apparatuses 12 and 13 is high. It is assumed that the communication stabilities between the communication apparatuses 11 and 12, between the communication apparatuses 11 and 13, and between the communication apparatuses 12 and 14 are low. The communication reliabilities required for the bidirectional communication paths (between the communication apparatuses 11 and 14, between the communication apparatuses 12 and 14, and between the communication apparatuses 13 and 14) for performing communication with the communication apparatus 14 having the attribute (a) (see FIG. 4) are high, so that the execution frequency is high (3/3). The communication stabilities of the bidirectional communication paths between the communication apparatuses 11 and 12 and between the communication apparatuses 11 and 13 are low, so that the execution frequency is intermediate (2/3). The communication stability of the bidirectional communication path between the communication apparatuses 12 and 13 is high, so that the execution frequency is low (1/3).

As illustrated in FIG. 5, at a first executable timing (T31), which is one of the executable timings (T31, T32, and T33) of measurement communication that repeatedly arrive at every predetermined time intervals (T (s)), measurement communications (S34 to S39) are performed on bidirectional communication paths for which the execution frequency is "1/3," "2/3," or "3/3," i.e., all bidirectional communication paths in the communication system 1. Measurement of the available bandwidth is performed by measuring the available bandwidth by transmitting a measurement packet from one of two communication apparatuses (hereinafter referred to as a "first apparatus") connected to the bidirectional communication path to the other of the two communication apparatuses (hereinafter referred to as a "second apparatus") and then transmitting a measurement packet from the second apparatus to the first apparatus. Thus, the available bandwidth of two communication paths (the transmitting path and the receiving path) of the bidirectional communication path can be simultaneously measured. As a result, the available bandwidths of all communication paths in the communication system 1 can be measured.

A second executable timing (T32) arrives when the predetermined time (T (s)) has elapsed after the first executable timing (T31). At the second executable timing, measurement communications (S41 to S45) are performed on bidirectional communication paths for which the execution frequency is "2/3" or "3/3," i.e., the bidirectional communication paths excluding the bidirectional communication path for which execution frequency is "1/3" (between communication apparatuses 12 and 13). Thus, the available bandwidths of all bidirectional communication paths excluding the bidirectional communication path between the communication apparatuses 12 and 13 are measured.

A third executable timing (T33) arrives when the predetermined time (T (s)) has elapsed after the second executable timing (T32). At the third executable timing, measurement communications (S46 to S48) are performed on bidirectional communication paths for which the execution frequency is "3/3," i.e., the bidirectional communication paths between communication apparatuses 11 and 14, between the communication apparatuses 12 and 14, and between the communication apparatuses 13 and 14. Thus, the available bandwidth of these bidirectional communication paths is measured.

When the next executable timing arrives when the predetermined time (T (s)) has elapsed after the third executable timing (T33), the process returns to the first executable timing in FIG. 5 and the above-described process is repeated.

The communication apparatus 12 performs communication control so that the frequency of measurement communication between the communication apparatuses 11 and 14 is adjusted. Because the communication apparatus 12 identifies the execution frequency in accordance with the communication stability and the communication reliability required for the communication path, the communication apparatus 12 can accurately measure the available bandwidth without performing unnecessary measurement communication. Thus, the communication apparatus 12 can select the optimum communication method, whereby the communication apparatus 12 can reliably perform a video conference with other communication apparatuses that are participating in the video conference.

Referring to FIGS. 6 to 10, processes performed by the CPU 21 will now be described. A first main process is performed only by the CPU 21 of the communication apparatus 12 that determines the execution frequency. Other processes (a second main process and a third main process) are performed by the CPUs 21 of all communication apparatuses 11 to 14. The CPUs 21 start and perform such processes when an application for performing a video conference is launched. An operation system switches between the processes as necessary. Thus, the processes are performed independently and parallely.

Figure 6:
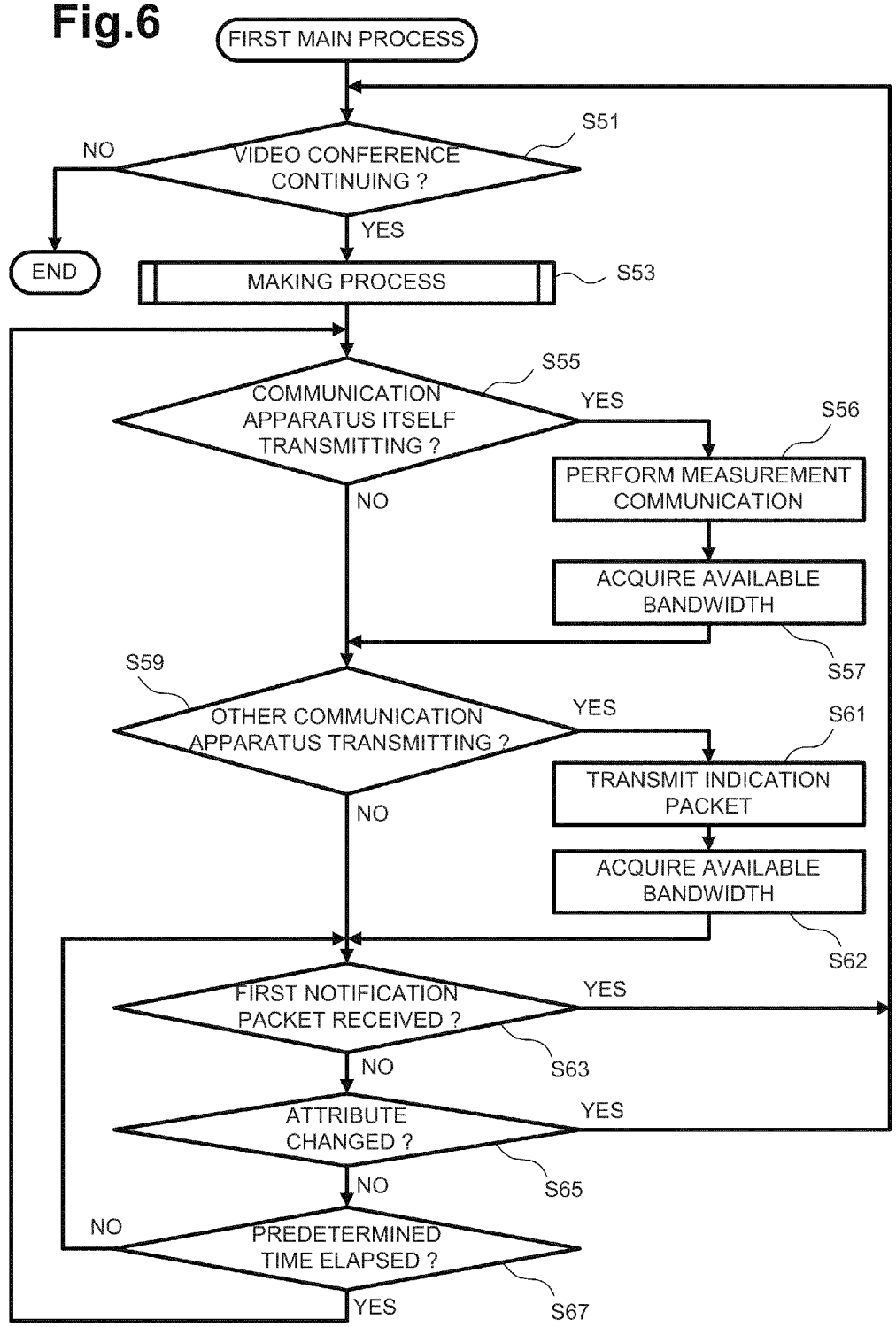
FIG. 6 is a flowchart showing a first main process according to an exemplary embodiment.

Referring to FIG. 6, the first main process will now be described. First, whether a video conference is continuously performed is determined (step S51). If an instruction to end the video conference is input a user (i.e., "NO" in step S51), the first main process is finished. If a video conference is continuously performed (i.e., "YES" in step S51), a process (making process, see FIG. 7) of making a fourth table (see FIG. 8) is performed in accordance with the execution frequency (step S53).

Figure 7:
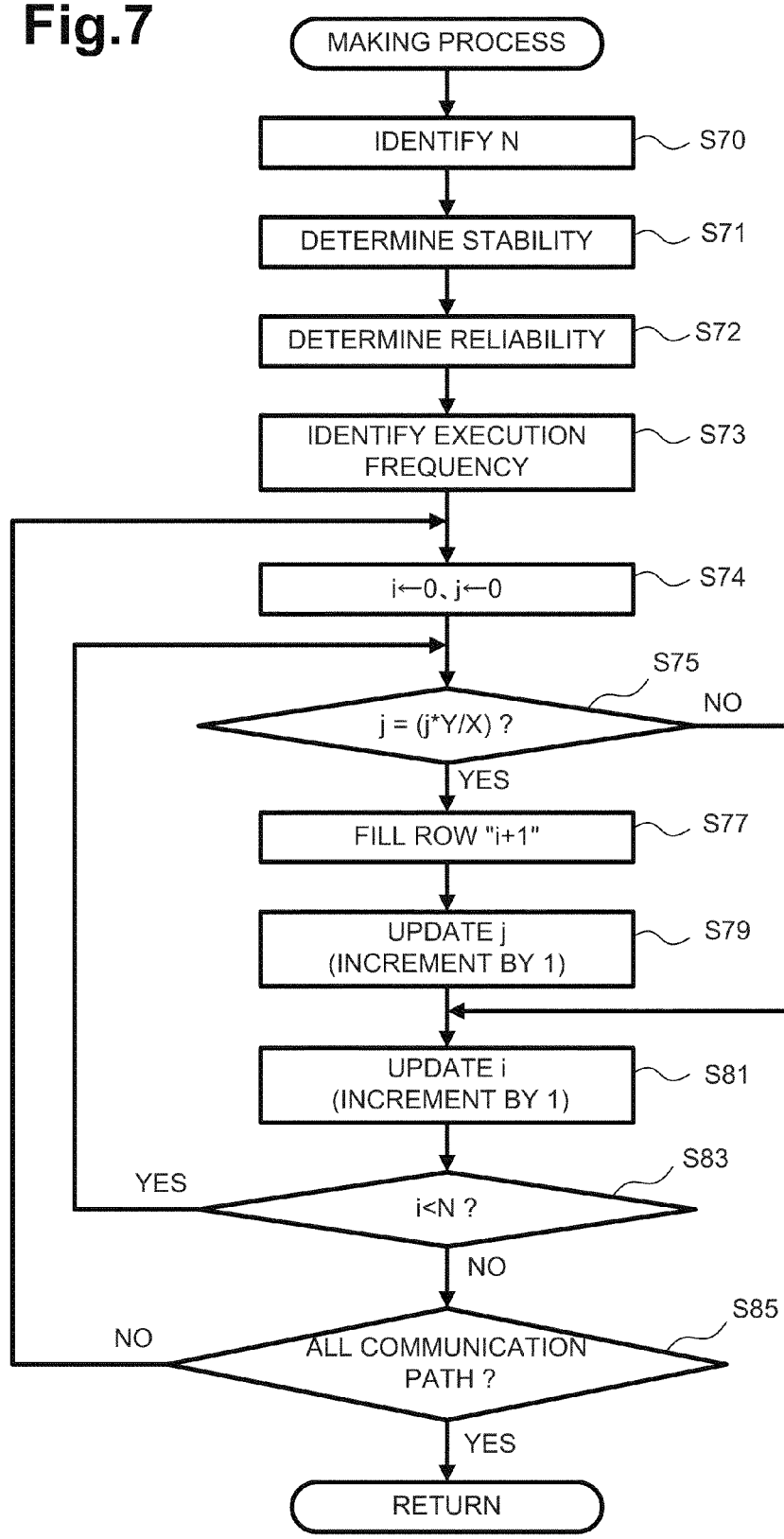
FIG. 7 is a flowchart showing an exemplary making process.
Figure 8:
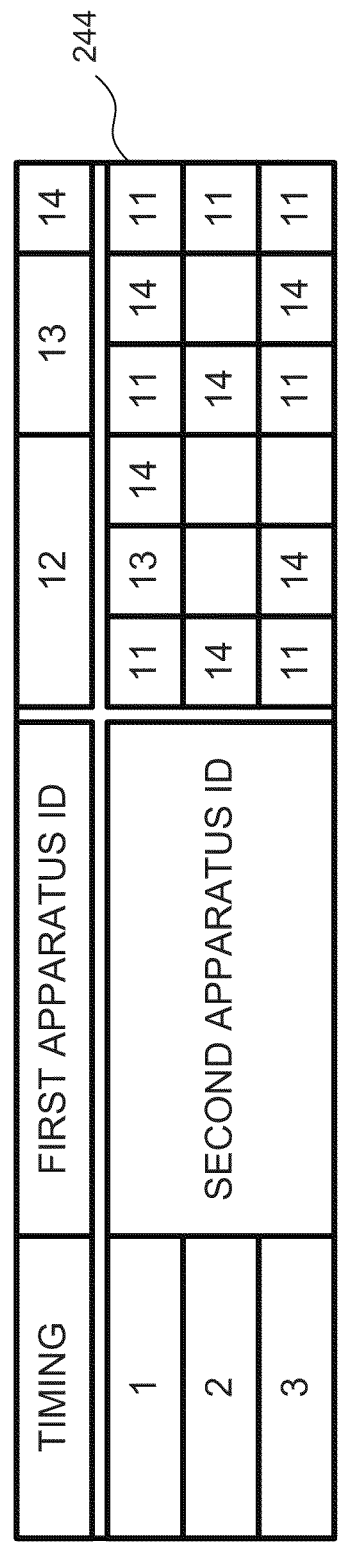
FIG. 8 is a schematic diagram showing an exemplary fourth table.

Referring to FIG. 8, an example of the process of making the fourth table 244, which is an example of a fourth table made by the making process (see FIG. 7, described below), will now be described. The communication apparatus 12 looks up the fourth table 244 when controlling measurement communication among the communication apparatuses 11 to 14. The fourth table 244 is made from the first table 241 (see FIG. 2), the second table 242 (see FIG. 3), and the third table 243 (see FIG. 4). The fourth table 244 stores the ID of the first apparatus and the ID of the second apparatus, which are associated with each other. The ID of the second apparatus is stored for each executable timing.

For example, for the first executable timing, the fourth table 244 stores IDs "11," "13," and "14" of second apparatuses (communication apparatuses 11, 13, and 14) with which the first apparatus having an ID "12" (communication apparatus 12) performs measurement communication. For the second executable timing, the fourth table 244 stores an ID "14" of a second apparatus (communication apparatus 14) with which the first apparatus having an ID "12" performs measurement communication. For the third executable timing, the fourth table 244 stores IDs "11" and "14" of second apparatuses (communication apparatus 11 and 14) with which the first apparatus having an ID "12" performs measurement communication. At the first executable timing, the communication apparatus 12 transmits measurement packets to the communication apparatuses 11, 13, and 14. The communication apparatuses 11, 13, and 14 receive the measurement packets and measure the available bandwidths, and then transmit measurement packets to the communication apparatus 12. At the second executable timing, the communication apparatus 12 transmits a measurement packet to the communication apparatus 14. The communication apparatus 14 receives the measurement packet and measures the available bandwidth, and then transmits a measurement packet to the communication apparatus 12. At the third executable timing, the communication apparatus 12 transmits measurement packets to the communication apparatuses 11 and 14. The communication apparatuses 11 and 14 receive the measurement packets and measure the available bandwidths, and then transmit communication packets to the communication apparatus 12. Thus, the communication apparatus 12 can perform measurement communication in accordance with a predetermined execution frequency by looking up the fourth table 244. As a result, the communication apparatus 12 can measure the available bandwidth of communication paths of each bidirectional communication path.

For example, for the first and third executable timings, the fourth table 244 stores IDs "11" and "14" of second apparatuses (communication apparatuses 11 and 14) with which the first apparatus having an ID "13" (communication apparatus 13) performs measurement communication. At the first and third executable timings, the communication apparatus 12 instructs the communication apparatus 13 to transmit measurement packets to the communication apparatuses 11 and 14. Following the instruction, the communication apparatus 13 transmits measurement packets to the communication apparatuses 11 and 14. The communication apparatuses 11 and 14 receive the measurement packets and measure the available bandwidth, and then transmit measurement packets to the communication apparatus 13. Thus, the communication apparatus 12 can control the communication apparatuses 11, 13, and 14 so that measurement communication is performed with a predetermined execution frequency by looking up the fourth table 244. The communication apparatus 12 can acquire the available bandwidths of communication paths that are not connected thereto by acquiring the measured available bandwidth.

Referring to FIG. 7, an exemplary making process will now be described. First, the least common multiple "N" of the values of the execution frequency "X," which are stored in the first table 241, is identified (step S70). For example, the values of execution frequency "X" stored in the first table 241 are all "3," so that the least common multiple "N" is identified as "3."

The communication stability is determined as follows. The second table 242 (see FIG. 3) is looked up. One of the bidirectional communication paths is selected. The historical deviations of the available bandwidths of two communication paths of the selected bidirectional communication path are calculated, and the larger deviation is identified. Depending on whether or not the identified deviation is equal to or larger than 10%, whether the communication stability of the communication path is (1) or (2) (see FIG. 2) is determined. The actually used bandwidths of two communication paths of the selected bidirectional communication path are subtracted from the latest available bandwidths in the history of the available bandwidths of the respective communication paths. If one of the subtracted results is larger than 2 Mbps, it is determined that the communication stability of the bidirectional communication path is (3) (see FIG. 2) (step S71).

The third table 243 (see FIG. 4) is looked up to determine which of the communication reliability (i), (ii), or (iii) (see FIG. 2) is required for the communication path, from the attributes of the communication apparatuses that are connected to both ends of the selected bidirectional communication path (step S72).

The communication stability (one of (1) to (3), see FIG. 2) determined in step S71 and the communication reliability (one of (i) to (iii), see FIG. 2) determined in step S72 are applied to the first table 241 (see FIG. 2). Thus, the execution frequency "Y/X" of measurement communication performed on the selected bidirectional communication path can be uniquely identified (step S73). In this way, the communication apparatus 12 can easily identify the execution frequency by looking up the first table 241.

Variables "i" and "j" are assigned a value "0" and initialized (step S74). "j*Y/X" is calculated, and the integer part of the calculated result is compared with "j" (step S75). If these are not equal (i.e., "NO" in step S75), the process proceeds to step S81.

If the integer part of the calculated result of "j*Y/X" is equal to "j" (i.e., "YES" in step S75), the fourth table 244 is updated. The update method will be described by using examples. It is assumed that, as illustrated in FIG. 3, the communication stability is determined on the basis of the communication path (in a frame 31) of the bidirectional communication path between the communication apparatuses 11 and 12, in which the first apparatus is the communication apparatus 12 and the second apparatus is the communication apparatus 11. In the fourth table 244 (see FIG. 8), the ID "11" of the communication apparatus 11, which is the second apparatus that corresponds to the first apparatus having an ID "12" and for which the executable timing is "i+1," is stored (step S77). j is incremented by 1 (step S79). The process proceeds to step S81.

In step S81, i is incremented by 1. Next, i is compared with N (step S83). If N is larger than i (i.e., "YES" in step S83), the process returns to step S75. If i is equal to or larger than N (i.e., "NO" in step S83), the process proceeds to step S85. Whether or not the above-described process has been performed for all communication paths that are stored in the second table 242 (see FIG. 2) is determined (step S85). If there is a communication path for which the process has not been performed (i.e., "NO" in step S85), the process returns to step S74. Another communication path is selected, and the process is repeated. If the above-described process has been performed for all communication paths (i.e., "YES" in step S85), the making process is finished, and the process returns to the first main process (see FIG. 6).

A process of making the fourth table 244 will be described by way of using an example. It is assumed that the communication reliabilities of bidirectional communication paths have been determined on the basis of the combinations of the first and second apparatuses in frames 31 to 36 in FIG. 3. It is also assumed that the execution frequency illustrated in FIG. 5 has been identified for the bidirectional communication path between the communication apparatuses 11 and 14. Because the execution frequency of the bidirectional communication path between the communication apparatuses 11 and 12 (first apparatus: 12, and second apparatus: 11) is "2/3", the integer part of "j*Y/X" (=0) is 0 when "i=0 and j=0," which is equal to j (i.e., "YES" in step S75). In the fourth table 244 (see FIG. 8), the ID "11" of the communication apparatus 11 is stored, which is the ID of the second apparatus that corresponds to the first apparatus having an ID "12" and for which the executable timing is "i+1=1," (step S77). i and j are updated (i=1 and j=1) (steps S79 and S81). Then, the integer part of "j*Y/X" (=0.667) is 0, which is not equal to i (i.e., "NO" in step S75). The fourth table 244 (see FIG. 8) is not updated. Next, i is updated (i=2 and j=1) (step S81). Then, the integer part of "j*Y/X" (=1.333) is 1, which is equal to j (i.e., "YES" in step S75). In the fourth table 244 (see FIG. 8), the ID "11" of the communication apparatus 11 is stored, which is an ID of the second apparatus that corresponds to the first apparatus having an ID "12" and for which the executable timing is "i+1=3," (step S77). The above-described process is repeated for combinations of the first and second apparatuses in the frames 31 to 36 in the second table 242 (see FIG. 2). Through the above-described process, the fourth table 244 (see FIG. 8) can be made.

As illustrated in FIG. 6, after the making process (step S53) is finished, the fourth table 244 (see FIG. 8) that has been made is looked up. At the first executable timing, whether the communication apparatus itself is a first apparatus and the communication apparatus transmits a measurement packet to a second apparatus is determined (step S55). If the ID of the communication apparatus is stored in the fourth table 244 as an ID of a first apparatus and the ID of a second apparatus is stored at the first executable timing (i.e., "YES" in step S55), measurement communication for measuring the available bandwidth of the bidirectional communication path between the communication apparatus itself and the second apparatus is performed as follows (step S56).

A measurement packet is transmitted to the second apparatus. The second apparatus receives the measurement packet and measures the available bandwidth. Thus, the second apparatus can identify the available bandwidth of the communication path between the second apparatus and the first apparatus (communication apparatus 12). The second apparatus stores the available bandwidth in a result packet, and sends back the result packet to the communication apparatus 12. The result packet that has been sent back is received, and the available bandwidth stored in the result packet is acquired (step S57). The acquired available bandwidth is associated with the communication path, and stored in the second table 242 (see FIG. 3). The second apparatus transmits a measurement packet to the first apparatus (communication apparatus 12) in order to measure the available bandwidth of the communication path between the second apparatus and the first apparatus (communication apparatus 12). The measurement packet is received and the available bandwidth is measured (step S57). The measured available bandwidth is associated with the communication path and stored in the second table 242 (see FIG. 3). The process proceeds to step S59. As described above, when measuring the available bandwidth of the bidirectional communication path between the communication apparatus 12 and the second apparatus, the communication apparatus 12 specifies itself as the communication apparatus that first transmits a measurement packet and performs measurement communication. During the measurement communication, measurement packets are not simultaneously transmitted from the first apparatus and the second apparatus, so that the available bandwidth can be reliably measured between the communication apparatuses. If it is determined that the communication apparatus 12 itself does not transmit a measurement packet (i.e., "NO" in step S55), the process proceeds to step S59.

The fourth table 244 (see FIG. 8), which has been made, is looked up. At the first executable timing, whether not to perform measurement communication between a first apparatus that is another communication apparatus and a second apparatus is determined (step S59). If, in the fourth table 244, the ID of the other communication apparatus is stored as the ID of a first apparatus and the ID of the second apparatus is stored for the first executable timing (i.e., "YES" in step S59), the following process is performed so as to perform measurement communication between the first apparatus and the second apparatus.

An indication packet for making the first apparatus transmit a measurement packet is transmitted to the first apparatus (step S61). The ID of the second apparatus is stored in the indication packet. The first apparatus receives the indication packet, identifies the second apparatus on the basis of the stored ID, and transmits a measurement packet to the second apparatus. The second apparatus receives the measurement packet, and measures the available bandwidth. Thus, the second apparatus can identify the available bandwidth of the communication path between the second apparatus and the first apparatus. The second apparatus stores the available bandwidth in a result packet, and sends back the result packet to the first apparatus. The first apparatus receives the result packet that has been sent back from the second apparatus. Thus, the first apparatus can identify the available bandwidth of the communication path between the first apparatus and the second apparatus. The first apparatus transfers the result packet that has been received from the second apparatus to the communication apparatus 12. The transferred result packet is received, and the stored available bandwidth is acquired (step S62). The acquired available bandwidth is associated with the communication path, and stored in the second table 242 (see FIG. 3).

The second apparatus transmits a measurement packet to the first apparatus in order to measure the available bandwidth of the communication path between the second apparatus and the first apparatus. The measurement packet is received by the first apparatus, and the available bandwidth is measured. The first apparatus stores the measured available bandwidth in a result packet, and sends back the result packet to the communication apparatus 12. The result packet that has been sent back is received, and the stored available bandwidth is acquired (S62). The acquired available bandwidth is associated with the communication path, and stored in the second table 242 (see FIG. 3). The process proceeds to step S63. As described above, when the communication apparatus 12 measures the available bandwidth of a communication path between a first apparatus and a second apparatus, the communication apparatus 12 specifies a communication apparatus that first transmits a measurement packet, and transmits an indication packet. During the measurement communication, measurement packets are not simultaneously transmitted from the first apparatus and the second apparatus, so that the available bandwidth of a communication path between the communication apparatuses is reliably measured. If it is determined that measurement communication with another communication apparatus is not performed (i.e., "NO" in step S59), the process proceeds to step S63.

Whether or not there has been a change in the configuration of the communication system 1 is determined. A communication apparatus that logs off the video conference transmits first notification packets to other communication apparatuses that are participating in the video conference (step S99 (see FIG. 9), step S113 (see FIG. 10)). A communication apparatus that logs on the video conference transmits first notification packets to other communication apparatuses. If the first notification packets are received (i.e., "YES" in step S63), it is determined that the configuration of the communication system 1 has been changed. In this case, because the fourth table 244 (see FIG. 8) needs to be restructured on the basis of the new configuration, the process returns to step S51.

If there has not been a change in the configuration of the communication system 1 (i.e., "NO" in step S63), whether or not the attributes of communication apparatuses that are participating in the video conference have changed is determined (step S65). A communication apparatus whose attribute has changed transmits second notification packets to other communication apparatuses that are participating in the video conference (step S107 (see FIG. 10)). The changed attribute is stored in the HDD 24 (step S109 (see FIG. 10)). If the second notification packets are received or the attribute stored in the HDD 24 changes (i.e., "YES" in step S65), it is determined that the attribute of one of the communication apparatuses that are participating in the video conference has been changed. In this case, because the fourth table 244 (see FIG. 8) needs to be restructured on the basis of the new attribute, the process returns to step S51.

If the attributes of communication apparatuses have not changed (i.e., "NO" in step S65), the process enters a standby state for a predetermined time (T (s)) (step S67). If the predetermined time has not elapsed (i.e., "NO" in step S67), the process returns to step S63. If the predetermined time (T(s)) has elapsed (i.e., "YES" in step S67), the process returns to step S55. In order to perform measurement communication at the second and later executable timings, the above-described process is repeated.

Figure 9:
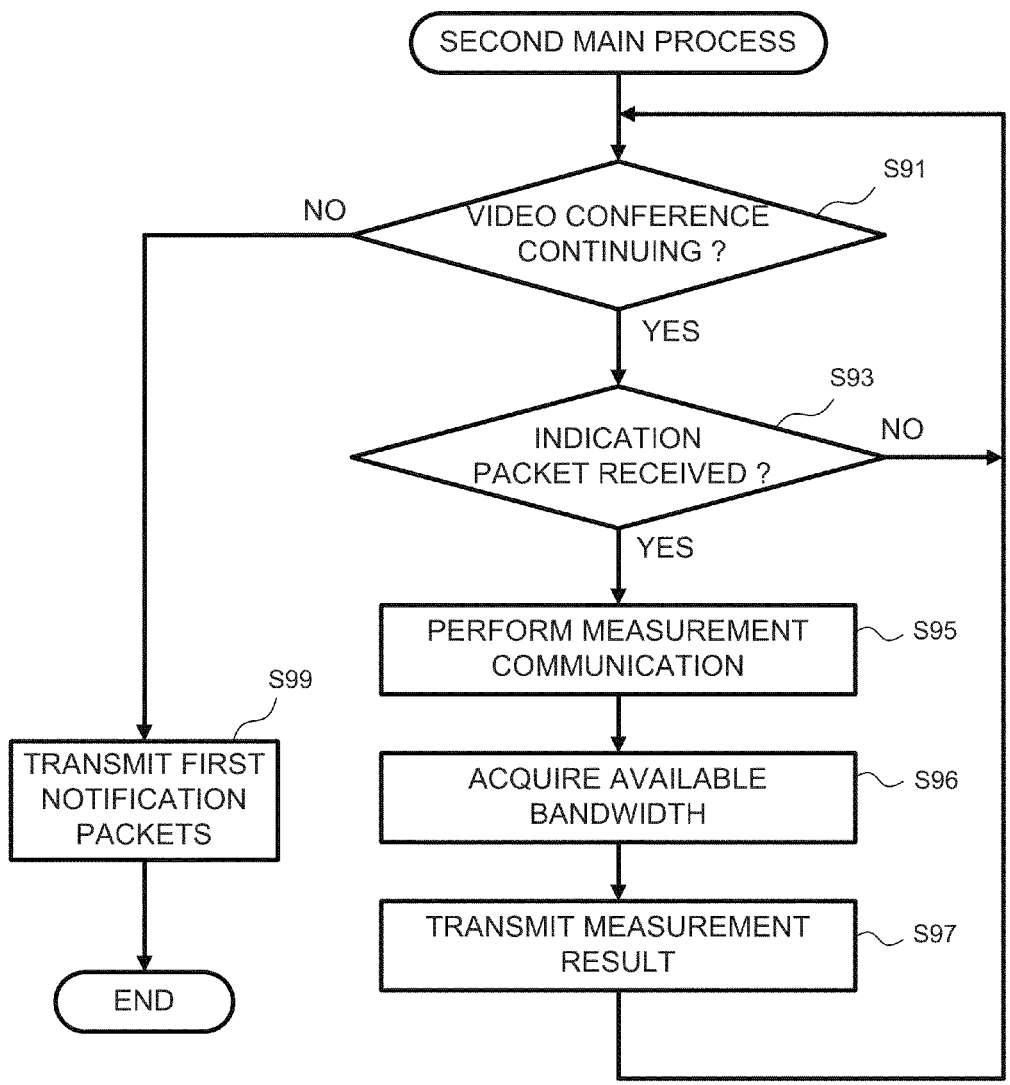
FIG. 9 is a flowchart showing a second main process according to an exemplary embodiment.

Referring to FIG. 9, an exemplary second main process will now be described. First, whether or not a video conference is continuously performed is determined (step S91). If the video conference has been finished (i.e., "NO" in step S91), in order to notify other communication apparatuses that are participating in the video conference of logging off the video conference, first notification packets are transmitted to the other communication apparatuses (step S99), and then the second main process finishes.

If a video conference is continuously performed (i.e., "YES" in step S91), whether an indication packet for starting measurement communication has been received from the communication apparatus 12 is determined (step S93). If the indication packet has not been received (i.e., "NO" in step S93), the process returns to step S91.

If the indication packet has been received (i.e., "YES" in step S93), a measurement packet is transmitted to a second apparatus having an ID stored in the indication packet. The second apparatus receives the measurement packet, and measures the available bandwidth of the communication path between the second apparatus and the first apparatus. The second apparatus sends back a result packet, which stores the measured available bandwidth, to the first apparatus. The first apparatus receives the result packet that has been sent back from the second apparatus. The second apparatus transmits a measurement packet to the first apparatus. The first apparatus receives the measurement packet, and measures the available bandwidth. In this way, measurement communication is performed between the first apparatus and the second apparatus (step S95). The available bandwidth stored in the received result packet and the available bandwidth measured by the communication apparatus itself are acquired (step S96). A result packet that stores the acquired available bandwidths is transmitted to the communication apparatus that transmitted the indication packet (step S97). The process returns to step S91.

Figure 10:
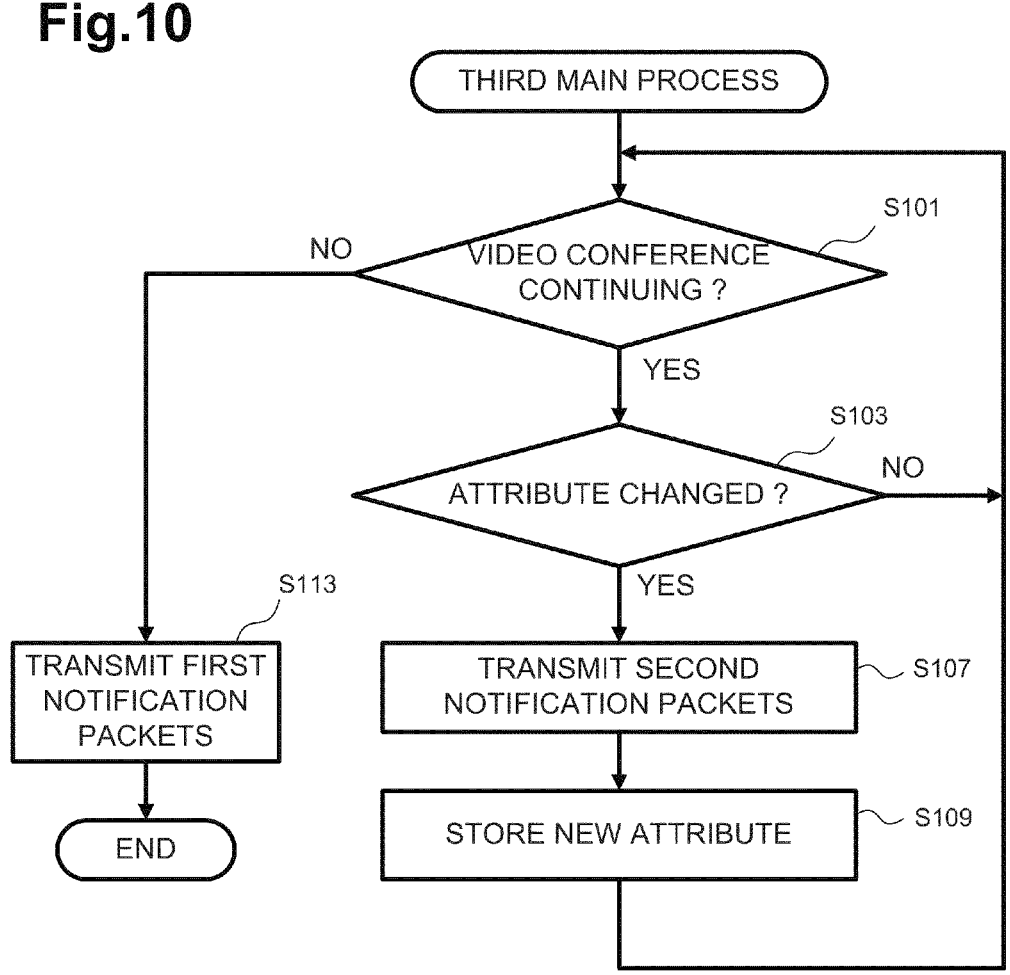
FIG. 10 is a flowchart showing a third main process according to an exemplary embodiment.

Referring to FIG. 10, an exemplary third main process will now be described. First, whether a video conference is continuously performed is determined (step S101). If the video conference has been finished (i.e., "NO" in step S101), first notification packets that notify other communication apparatuses of logging off the video conference are transmitted to the other communication apparatuses (step S113), and then the third main process finishes. If a video conference is continuously performed (i.e., "YES" in step S101), whether the attribute of the communication apparatus itself has been changed is determined (step S103). The attribute of a communication apparatus can be changed by an input operation by a user. If the attribute has been changed (i.e., "YES" in step S103), second notification packets that notify other communication apparatuses of the change in the attribute are transmitted to the other communication apparatuses (step S107). The new attribute is stored in the HDD 24 (step S109), and the process returns to step S101. If the attribute has not changed (i.e., "NO" in step S103), the process returns to step S101.

As heretofore described, the communication apparatuses 11 to 14 can accurately measure the available bandwidth of a communication path by performing measurement communication in accordance with the execution frequency. The communication apparatuses 11 to 14 can select the optimum communication method in accordance with the identified available bandwidth, so that each of the communication apparatuses can reliably perform communication with a counterpart apparatus. The execution frequency is identified in accordance with the communication stability and the communication reliability, so that an appropriate execution frequency can be identified for each bidirectional communication path. The communication apparatuses 11 to 14 can accurately measure the available bandwidth by performing measurement communication with the optimum execution frequency.

The present disclosure is not limited to the above-described exemplary embodiment, and can be modified in various ways.

In the above-described embodiment, the communication apparatus 12 determines the execution frequencies for all communication paths among the communication apparatuses 11 to 14. However, the present disclosure is not limited thereto. For example, each communication apparatus can identify the execution frequency of measurement communication and perform communication in accordance with the execution frequency.

In the above-described exemplary embodiment, the execution frequency of measurement communication is identified for each bidirectional communication path. However, the execution frequency of measurement communication can be identified for each communication path. In the above-described exemplary embodiment, if the execution frequency is identified for each bidirectional communication path, measurement communications for measuring the available bandwidth of two communication paths of the bidirectional communication path are continuously performed. However, the present disclosure is not limited thereto. For example, measurements of the available bandwidths of two communication paths of a bidirectional communication path can be performed at different timings.

In the above-described exemplary embodiment, the first apparatus that has received an indication packet transmits a measurement packet to the second apparatus. However, the present disclosure is not limited thereto. For example, the first apparatus that has received an indication packet can transmit a request packet that requests the second apparatus to transmit a measurement packet to the second apparatus. The second apparatus that has received the request packet may transmit a measurement packet to the first apparatus. The first apparatus may measure the available band width of the communication path by receiving the measurement packet transmitted from the second apparatus.

In the above-described exemplary embodiment, the execution frequency is determined in accordance with the communication stability and the communication reliability required for the communication path. However, the present disclosure is not limited thereto. For example, the communication apparatus can determine the execution frequency in accordance with only the communication stability. In the above-described exemplary embodiment, the execution frequency of measurement communication is determined. However, the execution cycle of measurement communication can be determined instead of the execution frequency.

While preferred embodiments have been described above, it is to be understood that variations and modifications will be apparent to those skilled in the art without departing from the scope and spirit of the disclosure.

What is claimed is:

1. A communication apparatus comprising:
   means for determining a communication stability in accordance with an available bandwidth of a communication path between the communication apparatus and a counterpart communication apparatus, the communication stability representing whether or not communication is stably performed via the communication path;
   means for identifying, in accordance with the determined communication stability, an execution frequency of bandwidth measurement communication for the communication path;
   means for acquiring an attribute of the counterpart apparatus,
   wherein the identifying means identifies the execution frequency, in response to the judgment that the attribute has changed, in accordance with the communication stability determined by the determining means and an attribute acquired by the attribute acquiring means; and means for judging, in response to the acquisition of the attribute by the acquiring means, whether the attribute has changed.

2. The communication apparatus according to claim 1, further comprising:

means for acquiring the available bandwidth of the communication path between the communication apparatus and the counterpart communication apparatus.

3. The communication apparatus according to claim 1, further comprising:

means for performing a bandwidth measurement communication with the counterpart communication apparatus in accordance with the identified execution frequency.

4. The communication apparatus according to claim 3, wherein the measurement communication is performed by transmitting a measurement packet from one of the communication apparatuses connected to one end of the communication path and by receiving the measurement packet by the other of the communication apparatuses connected to the other end of the communication path, and wherein the means for performing a bandwidth measurement specifies the communication apparatus that transmits the measurement packet and performs the measurement communication.

5. The communication apparatus according to claim 1, wherein the determining means determines the communication stability in accordance with a historical distribution of the available bandwidth.

6. The communication apparatus according to claim 1, wherein the determining means determines the communication stability on the basis of a relationship between the available bandwidth and an actually used bandwidth that is a bandwidth used when performing communication other than the measurement communication.

7. The communication apparatus according to claim 1, further comprising:

storage means for storing a table representing a relationship among the communication stability, the acquired attribute, and the execution frequency, wherein the identifying means identifies, by looking up the table, the execution frequency that is determined from the determined communication stability and acquired attribute.

8. A communication system comprising:

a communication apparatus;

plural counterpart communication apparatuses, each having a communication path to the communication apparatus;

means for acquiring an available bandwidth of each of at least two of the communication paths;

means for determining, for each of the at least two communication paths, a communication stability in accordance with the acquired available bandwidth, each determined communication stability representing whether or not communication is stably performed along the respective communication path;

means for identifying, in accordance with each determined communication stability, an execution frequency of bandwidth measurement communication for each communication path;

means for controlling the communication apparatuses to perform the bandwidth measurement communications in accordance with each respective identified execution frequency;

means for acquiring an attribute of the counterpart apparatus, wherein the identifying means identifies the execution frequency, in response to the judgment that the attribute has changed, in accordance with the communication stability determined by the determining means and an attribute acquired by the attribute acquiring means; and means for judging, in response to the acquisition of the attribute by the acquiring means, whether the attribute has changed.

9. The communication system according to claim 8, wherein the determining means determines each communication stability in accordance with a historical distribution of the available bandwidth for the respective communication path.

10. The communication system according to claim 8, wherein the determining means determines each communication stability on the basis of a relationship between the available bandwidth and an actually used bandwidth, for the respective communication path, that is a bandwidth used when performing communication other than the measurement communication.

11. The communication system according to claim 8, further comprising:

storage means for storing a table representing a relationship among each determined communication stability, each acquired attribute, and each identified execution frequency, wherein the identifying means identifies, by looking up in the table, each execution frequency that is determined from the determined communication stability and the acquired attribute.

12. The communication system according to claim 8, wherein the measurement communication is performed by transmitting a measurement packet from one of the communication apparatus and counterpart communication apparatus connected to one end of one of the communication paths and by receiving the measurement packet by one other of the communication apparatus and the counterpart communication apparatuses connected to the other end of the communication path, and wherein the means for performing a bandwidth measurement specifies the communication apparatus that transmits the measurement packet and performs the measurement communication.

13. A communication method that is performed by a communication terminal, the method comprising the steps of:

determining a communication stability in accordance with an available bandwidth of a communication path between the communication terminal and a counterpart communication apparatus, the communication stability representing whether or not communication is stably performed along the communication path;

identifying, in accordance with the determined communication stability, an execution frequency of bandwidth measurement communication for the communication path;

acquiring an attribute of the counterpart apparatus, wherein the identifying step identifies the execution frequency, in response to the judgment that the attribute has changed, in accordance with the communication stability determined by the determining step and an attribute acquired by the attribute acquiring step; and judging, in response to the acquisition of the attribute by the acquiring step, whether the attribute has changed.

14. The communication method according to claim 13, further comprising the step of:
    acquiring the available bandwidth of the communication path between the communication terminal and the counterpart communication apparatus by performing communication with the counterpart apparatus.

15. The communication method according to claim 13, further comprising the step of:
    performing the measurement communication with the counterpart apparatus in accordance with the identified execution frequency.

16. A non-transitory computer-readable medium storing a communication program that causes a communication terminal to perform instructions, the program comprising instructions that cause a computer to perform the steps of:
    determining a communication stability in accordance with an available bandwidth of a communication path between the communication terminal and a counterpart communication apparatus, the communication stability representing whether or not communication is stably performed along the communication path; and
    identifying, in accordance with the determined communication stability, an execution frequency of bandwidth measurement communication for the communication path;
    acquiring an attribute of the counterpart apparatus,
    wherein the identifying step identifies the execution frequency, in response to the judgment that the attribute has changed, in accordance with the communication stability determined by the determining step and an attribute acquired by the attribute acquiring step; and
    judging, in response to the acquisition of the attribute by the acquiring step, whether the attribute has changed.

17. The non-transitory computer readable medium according to claim 16, wherein the program further comprises instructions that cause a computer to perform the step of:
    acquiring the available bandwidth of the communication path between the communication terminal and the counterpart communication apparatus by performing communication with the counterpart apparatus.

18. The non-transitory computer readable medium according to claim 16, wherein the program further comprises instructions that cause a computer to perform the step of:
    performing the measurement communication with the counterpart apparatus in accordance with the identified execution frequency.

19. The non-transitory computer readable medium according to claim 16,
    wherein the determining step determines the communication stability in accordance with a historical distribution of the available bandwidth.

20. The non-transitory computer readable medium according to claim 16,
    wherein the determining step determines the communication stability on the basis of a relationship between the available bandwidth and an actually used bandwidth that is a bandwidth used when performing communication other than the measurement communication.

21. The non-transitory computer readable medium according to claim 16, further comprising:
    storing a table representing a relationship among the communication stability, the acquired attribute, and the execution frequency,
    wherein the identifying step identifies, by looking up the table, the execution frequency that is determined from the determined communication stability and acquired attribute.

22. The non-transitory computer readable medium according to claim 16,
    wherein the measurement communication is performed by transmitting a measurement packet from one of the communication apparatuses connected to one end of the communication path and by receiving the measurement packet by the other of the communication apparatuses connected to the other end of the communication path, and
    wherein the performing a bandwidth measurement step specifies the communication apparatus that transmits the measurement packet and performs the measurement communication.

* * * * *